July 14, 1942.                J. MIHALYI                2,289,797
CAMERA DIAL CONSTRUCTION
Filed Feb. 27, 1941

JOSEPH MIHALYI
INVENTOR

BY
ATTORNEYS

Patented July 14, 1942

2,289,797

UNITED STATES PATENT OFFICE 2,289,797

CAMERA DIAL CONSTRUCTION

Joseph Mihalyi, Rochester, N. Y., assignor to Eastman Kodak Company, Rochester, N. Y., a corporation of New Jersey Application February 27, 1941, Serial No. 380,842

8 Claims. (Cl. 116—124)

This invention relates to photography and more particularly to photographic cameras.

One object of my invention is to provide a camera with a setting dial which is easy to read. Another object of my invention is to provide a camera with a dial having graduations of substantial size and to provide a dial construction which permits the graduations to be spaced a sufficient distance to make them clearly legible. Another object is to provide a setting dial with a duplex scale construction in which at least one scale plate may be made to move more rapidly through at least a portion of its setting movement than the setting member so that the space between graduations which would otherwise be close together on the dial may be increased. Other objects will appear from the following specification, the novel features being particularly pointed out in the claims at the end thereof.

In cameras, and especially in compact cameras, it is necessary to provide various dials, many of which include scales having graduations closer over one portion of the dial plate than at other portions. Because of the compact size of some cameras, the graduation on the scales has been in extremely fine and small characters, making the scales difficult to read and also making the scales difficult to set opposite a pointer which is used in conjunction with the various graduations.

Such scales may be used for various purposes on cameras, such as scales denoting the speed for which the shutter may be set or the diaphragm opening. In focusing scales used for cameras having objectives of short focal length, the distance between certain graduations is comparatively slight, making it difficult to read the focal setting of the camera. Range finders may also be provided with movable scales which are none too legible, and this also applies to range finder elements, such as the focusable eye piece used on some of these instruments.

My invention is directed to overcoming the defects in the scales normally used on such cameras, and I have selected, by way of illustration, a shutter speed regulating dial on a camera of compact type. The construction which will be hereinafter described can, of course, be applied to any of the usual scales employed on cameras.

Coming now to the drawing, wherein like reference characters denote like parts throughout:

Figure 1:
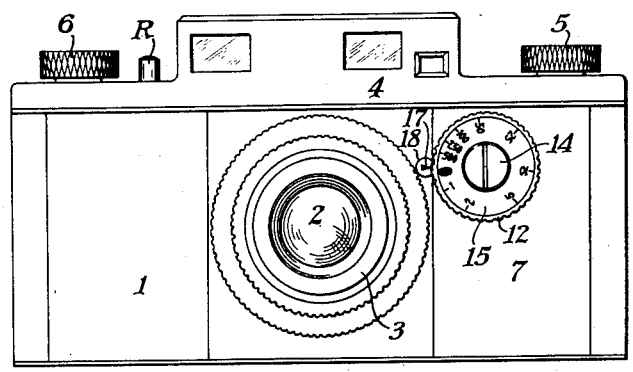
Fig. 1 is a front elevation of a typical camera having a shutter speed setting dial constructed in accordance with and embodying a preferred form of my invention.
Figure 2:
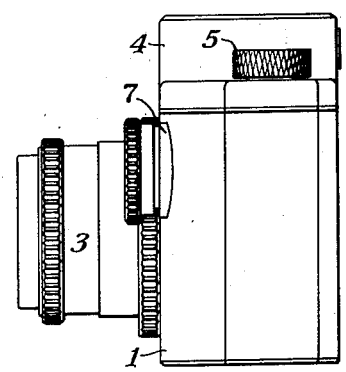
Fig. 2 is a side elevation of the camera shown in Fig. 1.

In the typical embodiment of my invention shown in the drawing, there may be the usual camera, having a body portion 1, supporting an objective 2 in a suitable focusing mount 3. On the top of the camera there is a housing 4 which may enclose parts of the camera operating mechanism and a range finder, if desired, and knobs 5 and 6 pass through the ends of this housing, one of these knobs being for winding film through the camera for exposure and the other for rewinding the film back into a retort or back onto the film winding spool, as is customary with film of comparatively small size.

The camera body 1 includes a front wall 7 which may be supported by a plate 8 on which a post 9 is fastened, this post supporting a hub member 10 which preferably carries a cam 11 or other shutter speed adjusting mechanism.

There is a manually operable knob 12 which is preferably milled or serrated to facilitate turning, this knob being of a more or less hollow construction and being attached to the hub member 10 by a plurality of screws 13. The knob and the hub member 10 may be retained on the post 9 by means of a screw 14 which also retains the dial plate 15 on the hub 10. This dial plate is movably mounted with respect to the knob 12 so that it may turn freely relatively to the hub 10 and graduations indicating shutter speeds may be brought opposite to a pointer 17 carried by a stud 18. It should be noticed that the dial plate 15 may turn in the groove 16 of the hub 10.

There is a second scale plate which is fixedly mounted with respect to the knob 12, that is, the small scale plate which consists of a flat head 20 on the end of a stud 19, attached to the wall 21 of the knob 12. This supplementary scale plate 20 carries, in the present example, only two characters on its outer surface, namely, "1000" indicating 1/1000 of a second, and "B" indicating the so-called bulb exposures or an exposure in which pressure of the shutter release, here shown as R, will open the shutter blades and release of the pressure will close the shutter blades.

Figure 4:
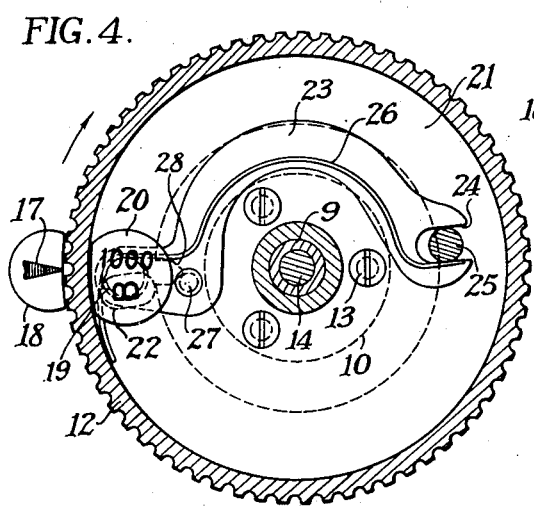
Fig. 4 is an enlarged detail section taken on line 4—4 of Fig. 3.

There is a connection for multiplying the movement of the scale plate 15 relative to the knob 12. A lever 23 may be pivoted upon the stud 19 and has at its opposite end a fork or slot 24 engaging a pin 25 extending downwardly from the scale plate 15. A spring 26 coiled around the stud 19 bears against the pin 25 and tends to turn the scale plate 15 until the parts are held in the position shown in Fig. 4, in which position the knob 12 may be turned in a counter-clockwise direction from the direction shown in Fig. 4 for bringing the graduations indicated as from "1" to "500" opposite to the pointer 17. It will be noticed that all these graduations are spaced apart a sufficient distance to be clearly visible so that such adjustment is relatively easy. However, the distance between the "500" graduation and the "1000" graduation, if this graduation were to be placed on the scale plate 15, would be so close that the size of the characters would have to be reduced and the parts would not be readily visible. It is therefore desirable to place the graduation "1000" on the supplementary scale plate 20 so that the parts can function in the following manner.

Figure 3:
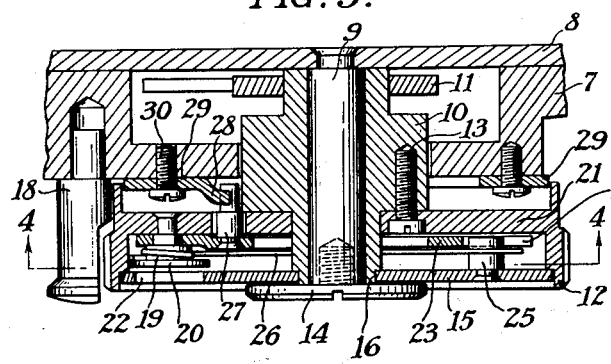
Fig. 3 is an enlarged detail sectional view, taken through the dial shown in Fig. 1.
Figure 6:
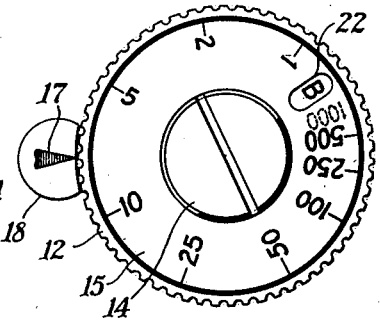
Fig. 6 is an enlarged detail showing the setting dial and pointer removed from a camera.
Figure 5:
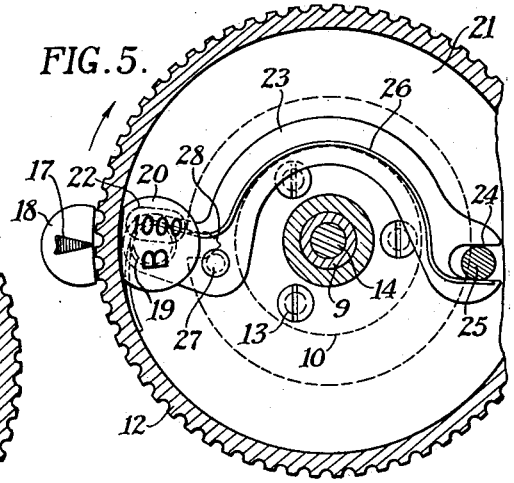
Fig. 5 is a view similar to Fig. 4, but with the parts in a different position.

The camera wall 7 carries a downwardly extending lug 28, as shown in Fig. 3, this lug being bent from the washer 29 attached to the camera wall by means of one or more screws 30. The lug 28 extends into the path of a pin 27 carried by the lever 23, and, with the parts in the normal position of Fig. 4, if the dial 12 is turned in the direction shown by the arrow, the pin 27 will strike the fixed lug 28, causing the gearing to move the dial plate 15 in the following manner. When the pin 27 strikes the lug 28, the lever 23 is swung about its pivot 19 so that the fork 24, by moving the pin 25 causes the scale plate 15 to move relative to the knob 12. This movement is likewise in the direction of movement of the knob—that is, in the direction shown by the arrow in Fig. 5, since the lug 28, by striking the pin 27, causes the lever 23 to approach the stud 9, thus moving the dial plate 15 until a window 22 in this dial plate is moved from a position exposing the character "B" to a position exposing the character "1000." Thus, the dial plate 15 is moved quite a material distance in adjusting the shutter for 1/1000 of a second, this "1000" character appearing on the supplementary scale plate 20, which is, as above described, fixedly attached to the wall 21 of the knob 12.

From the above description it will be seen that by providing a double dial construction, one dial being fixedly mounted and the other movably mounted on an adjusting knob, I have been able to provide a dial with reasonably large and readable characters, and I have been able to separate the characters which would otherwise lie too close together to be conveniently read. It is obvious that the construction described for the shutter speed setting dial can also be used for any of the other setting dials used on cameras, and it is to be understood that the above described embodiment is merely a preferred form of my invention as applied to a shutter speed regulating dial.

What I claim is:

1. In a setting dial for cameras, the combination with a setting knob, of a dial plate having a window revolubly carried thereby, a secondary dial plate fixedly carried by the knob, graduations carried by each dial plate, means for securing additional spacing between certain dial graduations on the movable dial plate comprising gearing carried by the knob and operatively connected to the movably mounted dial plate, for moving the latter more rapidly than said knob, and an abutment carried by the camera positioned for operating said gearing after a predetermined movement of said movably mounted dial plate whereby a graduation on the secondary dial may appear in said window.

2. In a setting dial for cameras, the combination with a setting knob, of a dial plate having a window revolubly carried thereby, a secondary dial plate fixedly carried by the knob, graduations carried by each dial plate, means for securing additional spacing between certain graduations on the movable dial plate including connections between the movable dial plate and the knob, an abutment on the camera lying in the path of said connections when the knob is turned to predetermined positions, said connections moving the movable dial and exposing graduations of the fixed dial through said window whereby graduations on either dial may be used according to the position of the knob.

3. In a setting dial for cameras, the combination with a setting knob, of a dial plate revolubly carried thereby, a secondary dial plate fixedly carried by the knob, graduations carried by each dial plate, a window in the movable dial plate, means for securing additional spacing between certain graduations on the movable dial plate by exposing the fixed dial plate through the window, comprising an abutment on the camera, and means for rapidly moving the movable dial plate comprising a movement multiplying lever carried by the knob and engaging the movable dial plate for moving the latter with respect to the fixed dial plate when the knob is turned to engage the lever and abutment, whereby a graduation on the secondary dial plate may appear through said window.

4. In a setting device for cameras, the combination with a setting knob, of a dial plate having a window pivotally mounted thereon, a pivot carried by the knob, a lever pivoted upon the pivot, said lever including an operable connection with the dial plate, means tending to hold the lever and dial plate in a fixed position relative to the knob to turn therewith through a predetermined range of movement, graduations on the dial plate, a pointer, said pointer and graduations being adapted to indicate a predetermined setting of the setting knob, a supplementary dial directly carried by the knob carrying graduations, and an abutment positioned on the camera in the path of the lever for rocking the lever after completing its predetermined range of movement to move the dial plate upon its pivotal support to render a supplementary dial plate graduation on the supplementary dial plate visible through said window to an operator to indicate a camera setting.

5. In a setting device for cameras, the combination with a setting knob, of a dial plate having a window pivotally mounted thereon, a pivot carried by the knob, a lever pivoted upon the pivot, said lever including an operable connection with the dial plate, means tending to hold the lever and dial plate in a fixed position relative to the knob to turn therewith, graduations on the dial plate, a pointer, said pointer and graduations being adapted to indicate a predetermined setting of the setting knob, a supplementary dial directly carried by the knob carrying graduations, and an abutment positioned on the camera in the path of the lever for rocking the lever to move the dial plate upon its pivotal support to render a supplementary dial plate graduation visible through said window to an operator to indicate a camera setting, the location of the lever pivot and the connection between the lever and dial plate being of such proportions that the supplementary dial remains inactive through the greater part of the movement of said setting knob and the scale plate may be moved relative to the knob in the same direction as the knob is moved when said lever contacts with said abutment at the end of such movement.

6. In a setting device for cameras, the combination with a setting knob, of a dial plate having a window pivotally mounted thereon, a pivot carried by the knob, a lever pivoted upon the pivot, said lever including an operable connection with the dial plate, means tending to hold the lever and dial plate in a fixed position relative to the knob to turn therewith, graduations on the dial plate, a pointer, said pointer and graduations being adapted to indicate a predetermined setting of the setting knob, a supplementary dial directly carried by the knob carrying graduations, and an abutment positioned on the camera in the path of the lever for rocking the lever to move the dial plate upon its pivotal support to render a supplementary dial plate graduation visible through said window to an operator to indicate a camera setting, the lever, by turning on its pivot through contact with said abutment, moving the dial plate more rapidly than the movement of the knob to a position for exposing a graduation on the supplementary dial fixedly carried by the knob the location of the abutment being such that said secondary dial may be viewed through said window only after predetermined movement of said knob.

7. In a setting device for cameras, the combination with a setting knob, of a dial plate pivotally mounted thereon, a pivot carried by the knob, a lever pivoted upon the pivot, said lever including an operable connection with the dial plate, means tending to hold the lever and dial plate in a fixed position relative to the knob to turn therewith, graduations on the dial plate, a pointer, said pointer and graduations being adapted to indicate a predetermined setting of the setting knob, a supplementary dial directly carried by the knob carrying graduations, and an abutment positioned on the camera in the path of the lever for rocking the lever to move the dial plate upon its pivotal support to render a supplementary dial plate graduation visible to an operator to indicate a camera setting, a window in the dial plate, the lever turning upon its pivot to move the dial plate window to expose a supplementary dial graduation only when said knob is turned to contact said lever with said abutment.

8. In a setting device for cameras, the combination with a setting knob, of a dial plate pivotally mounted thereon, a pivot carried by the knob, a lever pivoted upon the pivot, said lever including an operable connection with the dial plate, means tending to hold the lever and dial plate in a fixed position relative to the knob to turn therewith, graduations on the dial plate, a pointer, said pointer and graduations being adapted to indicate a predetermined setting of the setting knob, a supplementary dial directly carried by the knob carrying graduations, and an abutment positioned on the camera in the path of the lever for rocking the lever to move the dial plate upon its pivotal support to render a supplementary dial plate graduation visible to an operator to indicate a camera setting, a window in the dial plate, the lever turning upon its pivot to move the dial plate window to expose a supplementary dial graduation only when said knob is turned to contact said lever with said abutment, and a spring for normally holding the dial in a fixed position relative to the knob.

JOSEPH MIHALYI.